INVENTOR.
Nawokich Tanaka
BY

United States Patent Office 3,053,135
Patented Sept. 11, 1962

3,053,135
REFRACTOR FOR PRESENTING PICTURES IN THREE DIMENSIONAL EFFECT
Nawokich Tanaka, 136 Eldridge St., New York, N.Y.
Filed May 9, 1960, Ser. No. 27,908
5 Claims. (Cl. 88—1)

This invention relates to refractive means for presenting customary photographic pictures or the like perspective pictures recorded or projected on carriers in three dimensional effect, without requiring viewing aid, by adding depth effect to the widths and heights of the pictures. Needless to add, it implies that the present invention does not depend for producing the effect upon the coordination of stereoscopically related left and right eye views, the vital requirement of all known stereoscopic devices.

It is therefore apparent, the invention involves a certain unprecedented discovery. Despite the fundamental departure from the traditional stereoscopic method, depth phenomena created through the present method are by no means mere manifestation of so-called pseudo depth effect, as skeptics would like to presume mindful of many fruitless attempts in the past toward developing simpler and more versatile means than the stereoscopic device for the purpose. In this era of advanced art of picture in other directions with natural-colored, articulate and televised pictures such development is long overdue.

Before delving into details of the invention it may not be superfluous to review some common occurrences, the facts from which this invention was conceived. In our daily life our eyes usually view things around us either with or without fixating on a specific object, namely either in a binocular way or generic way of viewing. No stereoscopic way of viewing is possible, since simultaneous fixation of both eyes on all objects at different remoteness in a natural scene is physiologically impossible for normal eyes.

In a binocular way of viewing, the eyes of a viewer are fixated on a particular object in a scene and hence the object so fixated on appears well defined, leaving the objects at the rest of the scene within the sight scope of both eyes more or less in blur and/or in double vision varying with the remoteness from the fixated object. Of course eyes can not only freely change fixating object time to time but also expand the fixated area to some extent. However the binocular way of viewing is the temporary rather than the normal way for the reason that the fixation of eyes requires certain effort of ocular sensory organs and hence has an endurance limitation. When allowed to relax from fixation, eyes naturally and often unwittingly shift their viewing mode to the less taxing way that is the easier normal way termed herein generic way.

In the generic way of viewing, the eyes of a viewer are not bound to fixate on any specific object, though each eye is at attention perceiving everything generally and ready to fixate on any thing within the sight scope of both eyes. In generic viewing things appear somewhat softened with the tendency of appearing in double vision. This is the cost paid for the broader viewing. But since the third dimensional or depth effect perceptible to normal eyes is dependent upon the relative position of objects in a scene, clearer perception of neighboring objects would enhance the effect, particularly when a large scene is viewed for its depth.

The present invention aims to give viewers of three dimensional perception in an appropriate picture as they perceive in a generic viewing but without the tendency of eyes seeing double vision.

The generic object of this invention is to provide means capable to make ordinary perspective pictures appear in three dimensional effect to unaided eyes. An object of this invention is to provide simple and inexpensive means for presenting pictures in three dimensional effect directly applicable to existing picture showing devices of various sizes for divers purposes including video, motion pictures, back sceneries, advertising displays and others. The primary object and feature of this invention are the employment of an unprecedented method for presenting customary photographic or the like pictures in three dimensional effect entirely independent of the traditional stereoscopic method and therefore simpler and more versatile for universal uses. Another feature of the invention is the provision of exceptionally simple and inexpensive means for the mission, requiring neither specially made pictures nor special illumination.

With the above and other objects in view my invention comprises certain detail of construction and arrangement of parts as will be more fully described, illustrated and claimed hereinafter, the reference being taken in the accompanying drawings which form a part of this specification and in which:

Similar letters and numerals designate similar or corresponding parts throughout all views.

Figure 1:
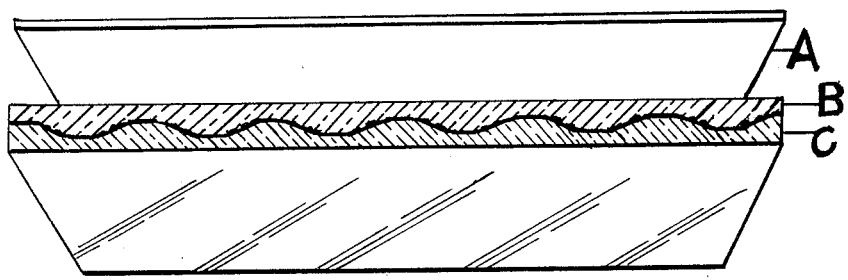
FIG. 1 represents a perspective view of a picture presenting system involving this invention, the top part of the front member being intentionally shown in section for better identification of parts.

In FIG. 1, letter A designates a picture or a picture carrier of opaque, translucent or transparent material depending upon the employment. Disposed a distance apart in front of and parallel to picture carrier A, a refractor consists of primary plate B and secondary plate C. A picture on the carrier is viewed through the refractor with the interpupillary line of a viewer in a horizontal position. The spacing distance between the refractor and picture carrier is important as one of controlling factors of depth effect of pictures and therefore should be properly adjusted in accordance to the refractive power of individual refractor for desired result, as will be later discussed. Plates B and C are moulded of suitable transparent material, such as acrylic or acetate plastics, glass or the like.

Figure 3:
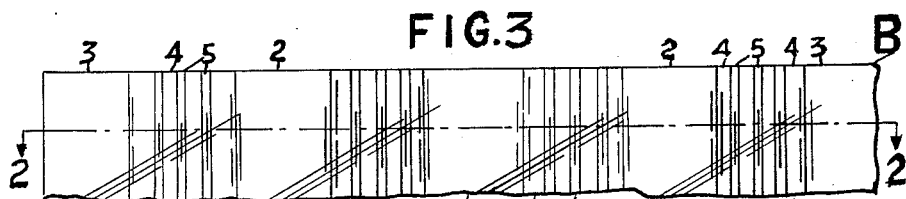
FIG. 3 shows the inner surface of the upper plate of FIG. 2, the section of the latter being taken along lines 2—2 in this and the next views.
Figure 2:
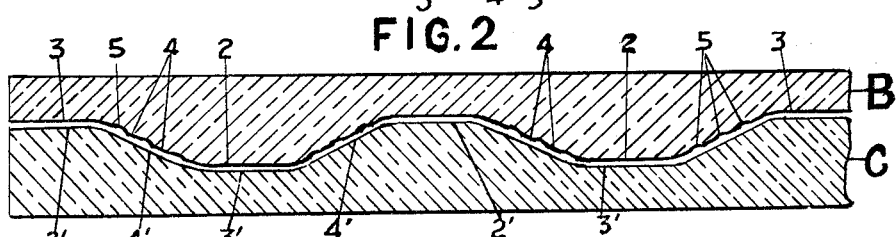
FIG. 2 illustrates a cross-section of a refractor embodying this invention, similar to the front member of FIG. 1.
Figure 4:
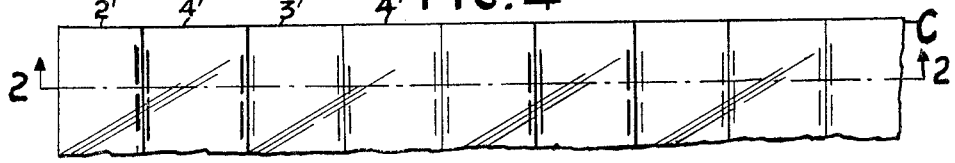
FIG. 4 shows the inner surface of the lower plate in FIG. 2.
Figure 6:
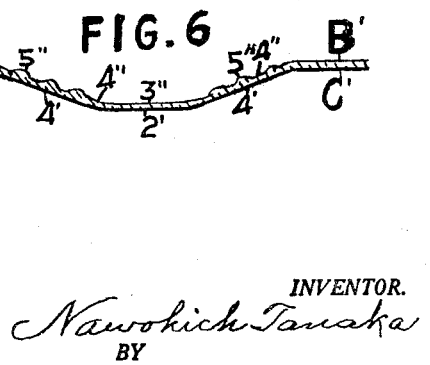
FIG. 6 shows a modification of the refractor of FIG. 2.

Referring to FIGS. 2, 3 and 4, both primary and secondary plates B and C have their confronting surfaces indented to recurrent wave-like shapes, approximately complementary to each other, and are set in a meshing relation either in contact as in FIG. 1 or in close proximity spaced by a thin layer of air or other transparent spacer as in FIGS. 2 and 6. Since the two surfaces are not precisely complemental to one another, I add "approximately" to express the presence of certain discrepancy therebetween, as will be later apparent.

Figure 5:
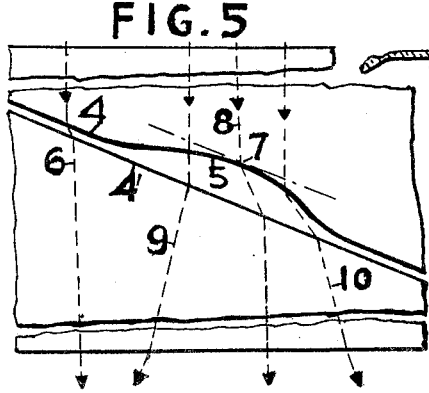
FIG. 5 depicts refraction of light rays through the refractor of FIG. 2.

Each wave pitch or cycle of the wave shape on both plates comprises ridge or crest 2, wave bottom 3 and left and right wave slopes 4, 4, smoothly continuing as a whole without undue sharp turns. However, analogously to small waves riding on a larger wave, the slopes on primary plate B carry or include parallel grooves or alternately occurring boss and recess parts in narrow strips 5, 5 running across the sloping direction of the respective slope or generally in parallel to the respective wave ridges and bottoms. The number, widths, depth and lengths of these strips are suitably chosen to be more effective and less discernible to eyes at intended viewing distances. A preferable cross-wise contour of such strips is depicted in FIG. 5.

The inner surface of secondary plate C does not basically require the provision of boss and recess strips, as its function is essentially to eliminate or reduce the potential distortive effect of plate B on transmitted images by neutralization or counter action.

In FIG. 6 another embodiment of the invention is shown. The two sides of a transparent plate are wave shaped similarly as the wave shapes on plates B and C as indicated by corresponding letters B' and C'. The wave shapes on the opposite sides are positioned in a meshing relation, utilizing the body of the refractor as the spacer. This form is much simpler and convenient, particularly in applying to devices for large pictures.

The wave pitches of the indentations of both plates are preferably equal for facility in mould making and adjusting in construction of apparatus, though certain irregularity is tolerable, even desirable for augmenting the effect for a purpose. In the same sense the wave height or depth of depressions of individual wave may be varied for advantage. In other words, strict adherence to the basical uniformity is not an imperative necessity because of the wide tolerance.

FIG. 5 represents the profile of a small fragmental part of the refractor, the diagram being drawn in a greatly magnified scale in order to show more clearly a preferable contour of a depression 5 appearing in the preceding views and to explain the propagation of light rays through the refractor.

The wave shapes of plates B and C may be varied sectionally or as a whole over comparatively wide range of dimensions in order to meet the variance of picture size and different viewing scopes or to be versatile in applying to various picture showing systems, ranging from a small framed picture to a large picture such as a motion picture or back scenery.

For small pictures and close viewing a smaller spacing between the refractor and picture carrier is desirable even at expenses. The expenses are reduced effective viewing angle and thicker refractor plates required to contain wave slopes of increased sloping angle for stronger refractive power of the refractor. On the other hand, for a large picture and comparatively long distance viewing, the spacing may be sufficiently increased to permit the use of wave slopes of small sloping angles for a wide effective viewing angle.

All other conditions remaining the same, the depth effect in a picture on the carrier gradually improves with increase of the spacing between the refractor and picture, pseudo effect being discounted, from zero to a stage at which auxiliary images of the picture are conspicuously perceptible, analogously to double images of natural objects perceptible in generic viewing as previously described. The best depth effect and hence three dimensional effect of the picture should be perceptible before or around this stage.

Depth effect in a picture perceptible through the present device is also augmented to considerable degree with increase of viewing distance, favoring larger and distinct pictures and longer viewing distance. When prominence of three dimensional effect in a picture too closely placed behind the refractor appears insufficient, it will be improved greatly by viewing the picture at a farther away position without increasing the spacing between the refractor and picture.

Beside the depth controlling factors already referred to, perception of depth effect is greatly, if not vitally, dependent upon the quality of picture and way and means of illumination, to say nothing of physiological function of viewers. Clear pictures portraying more closely natural objects or a scene with better contrast between parts for easy and quicker recognition are of course more desirable since the invention depends for its operation upon a single picture. As to illumination for pictures, indirect light on a picture with an opaque carrier and back illumination on a picture with a transparent or translucent carrier are the best for prominency of the effect, because of least surface reflection of light to interfere with.

With so many influencing agents some immeasurable in mathematic figures added to the lack of precedenting data, the description herein largely relies on experimenal facts, like the most of discoveries.

It is found that pitch dimensions of the wave shape may be varied within indefinite limit without significant difference in manifestation of depth effect, provided the angle of slope remains the same. Pitches may be chosen in accordance to the fineness or coarseness of pictures between five eighths of an inch and two and a half inches, equal to the interpupillary distance, leaving larger and smaller pitches for extra coarse and fine pictures.

To give merely an idea about the dimensions of parts the following example is added: Appropriate dimensional values, for medium sized pictures and viewing distances, 1¼ inches for wave pitch, 1/16 inch for the spacing between waved surfaces, and around 20 degrees for the maximum sloping angle. A picture is to be placed about three inches behind the refractor and viewed at a distance of preferably more than five feet.

Light rays from a picture on picture carrier A (FIG. 1) propagating through the refractor may take either one of three ways:

First, major portion of the light rays incident on the back surface of the refractor travel via ridges and bottoms of both wave shapes substantially without changing normal propagating direction, as the surfaces of ridges 2 and bottoms 3 are parallel to each other.

Second, another portion of the incident rays takes routes of propagation through the straight parts of slopes of both plates, also substantially without change in propagating direction. Broken line 6 in FIG. 5 shows such a case. This includes cases in which light rays happen to impinge on depression part parallel to slope 4 as indicated by 7, broken line 8 denoting the path of light rays. Ignoring slight shifting of paths of light beams in the preceding two ways, as is allowable when the indented surfaces are in close proximity to each other, these light beams in concert transmit virtually continuous images of a picture on carrier A (FIG. 1). These images are perceived by viewers at different angles of viewing as steady principal visions.

Third, minor portion of light rays from the picture impinges on depressions 5, 5 of slopes 4, 4 (FIG. 2) on either sides of parallel point as point 7 (FIG. 5). Light rays striking at the left side of point 7 are refracted leftwardly while those impinging at the right side are refracted rightwardly, as respectively indicated by broken lines 9 and 10. The same wording goes to refraction on the opposite side of the wave shape but in opposite aspect. Meanwhile for that matter similar refractions are taking place at each of the other slope parts of the refractor. The combination of leftwardly refracted rays gives rise to broken or hazy rightwardly displaced auxiliary images while the combination of rightwardly refracted rays transmits similar leftwardly displaced images. These images are perceived by the same viewers as side or auxiliary visions on respective sides of the principal visions.

As in the cases of FIGS. 2 and 6, when any spacing is present between the waved surfaces there would be irregularly refracted rays passing through areas not in parallel to each other, particularly at the ends of slopes, these irregular rays being refracted leftwardly and rightwardly also contribute in transmitting side images.

The visual lines for the principal visions from both eyes intersect slightly in front of or practically on the plane of the picture. The principal visions being predominant over the auxiliary visions give required stability to the coordinated vision of the picture. The visual lines for auxiliary vision from the left eye meet the visual lines for the principal vision from the right eye in front and at the back of the picture plane, while the visual lines for the auxiliary vision from the right eye intersect with the visual lines for the principal vision from the left eye also before and behind the picture plane. Speaking of the intersections of visual lines behind the picture plane alone, in the former case a side vision appears at left of the principal vision and in the latter case at right or in other words each eye sees a side vision on its own side exclusively of the other eye. Also the intersections of visual lines in front of the picture plane cause the displacement of vision in reverse direction, contributing to the appearance of fore ground objects in front of the picture plane. The aggregate result of the intersections gives rise to perception of the third dimension.

From the foregoing description taken in connection with the accompanying drawings, the construction and arrangement of parts will be readily apparent to those skilled in the art to which this invention appertains, and while I have herein shown and described the apparatus as I now believe to be the best embodiment of my invention, this is merely illustrative and I may make such changes or modifications, when desired, as to fall within the scope of the invention as claimed.

Having thus described my invention what I claim as new is:

1. A refractor for making a picture positioned therebehind perceptible in three dimensional effect to viewers in front thereof, having a cooperative pair of refractive surfaces in generally matching wave-like shapes superposed with the wave ridges of one shape in close proximity to the wave bottoms of the other shape to neutralize distortive optical quality of each individual wave shape, one of said refractive surfaces being provided at its sloping parts of the wave-like shape with a multiplicity of boss-and-recess strip parts generally in parallel to their respective ridge and bottom parts of the wave shape for deriving oppositely displaced images of the picture through the alternate slope parts on the opposite sides of the wave ridges, functionally, the three dimensional effect perceptible to a viewer at a given position being maximum, when the viewer's interpupillary line is parallel to an imaginary plane perpendicular generally to said wave ridges and bottoms, and minimum, when the interpupillary line is perpendicular to the plane.

2. A refractor for making a picture positioned therebehind perceptible in three dimensional effect to viewers in front thereof, having a cooperative pair of refractive surfaces in matching wave-like shapes, superposed in meshing relation to neutralize distortive optical quality of each individual wave shape, the wave slopes of one of said shapes including a multiplicity of bosses and recesses in alternate strips generally in parallel to their respective wave ridges and wave bottoms of the wave shape for deriving oppositely displaced images of the picture through the alternate slopes on the opposite sides of the wave ridges functionally, the three dimensional effect perceptible to a viewer at a given position being maximum, when the viewer's interpupillary line is parallel to an imaginary plane perpendicular generally to said wave ridges and bottoms, and minimum, when the interpupillary line is perpendicular to the plane.

3. A refractor for making a picture positioned therebehind perceptible in three dimensional effect to viewers in front thereof, having two refractive surfaces in fairly matching wave shapes positioned on the opposite sides of a transparent layer with the wave ridges of one surface in close proximity to the wave bottoms of the other surface and vice versa to neutralize distortive optical quality of each individual wave shape, the sloping parts of one of said wave shaped surfaces including a multitude of boss-and-recess strip parts generally in parallel to their respective ridge and bottom parts of the wave shaped surface for deriving oppositely displaced images of the picture through the alternate slopes on the opposite sides of the wave ridges, functionally the three dimensional effect perceptible to a viewer at a given position being maximum, when the viewer's interpupillary line is parallel to an imaginary plane perpendicular generally to said wave ridges and bottoms, and minimum, when the interpupillary line is perpendicular to the plane.

4. A refractor for making a picture positioned therebehind perceptible in three dimensional effect to viewers in front thereof, having two transparent sheets each provided with plane and wave shaped refractive surfaces, the wave shapes of the two surfaces matching to each other, said two transparent sheets being superposed with the waved surfaces facing one another in meshing relation to neutralize distortive optical quality of each individual waved surface, and the wave slopes of one of said surfaces including a multitude of grooves generally in parallel to their respective wave ridges and bottoms for deriving oppositely displaced images of the picture through the alternate wave slopes on the opposite sides of the wave ridges, functionally, the three dimensional effect perceptible to a viewer at a given position being maximum, when the viewer's interpupillary line is parallel to an imaginary plane perpendicular generally to said wave ridges and bottoms, and minimum, when the interpupillary line is perpendicular to the plane.

5. A refractor for making a picture positioned therebehind perceptible in three dimensional effect to viewers in front thereof, having a transparent sheet the two sides thereof indented to matching wave shapes with the wave ridges of one surface opposing the wave bottoms of the other surface in close proximity and vice versa to neutralize distortive optical quality of each individual surface, the wave slopes of one of said shapes including a multiplicity of boss-recess strips generally in parallel to their respective wave ridges and bottoms for deriving oppositely displaced images of the picture through the alternate wave slopes on the opposite sides of the wave ridges, functionally, the three dimensional effect perceptible to a viewer at a given position being maximum, when the viewer's interpupillary line is parallel to an imaginary plane perpendicular generally to said wave ridges and bottoms, and minimum when the interpupillary line is perpendicular to the plane.

References Cited in the file of this patent

UNITED STATES PATENTS

| | | |
|---|---|---|
| 1,943,995 | Weld | Jan. 16, 1934 |
| 2,268,351 | Tanaka | Dec. 30, 1941 |